United States Patent Office 3,302,932
Patented Feb. 7, 1967

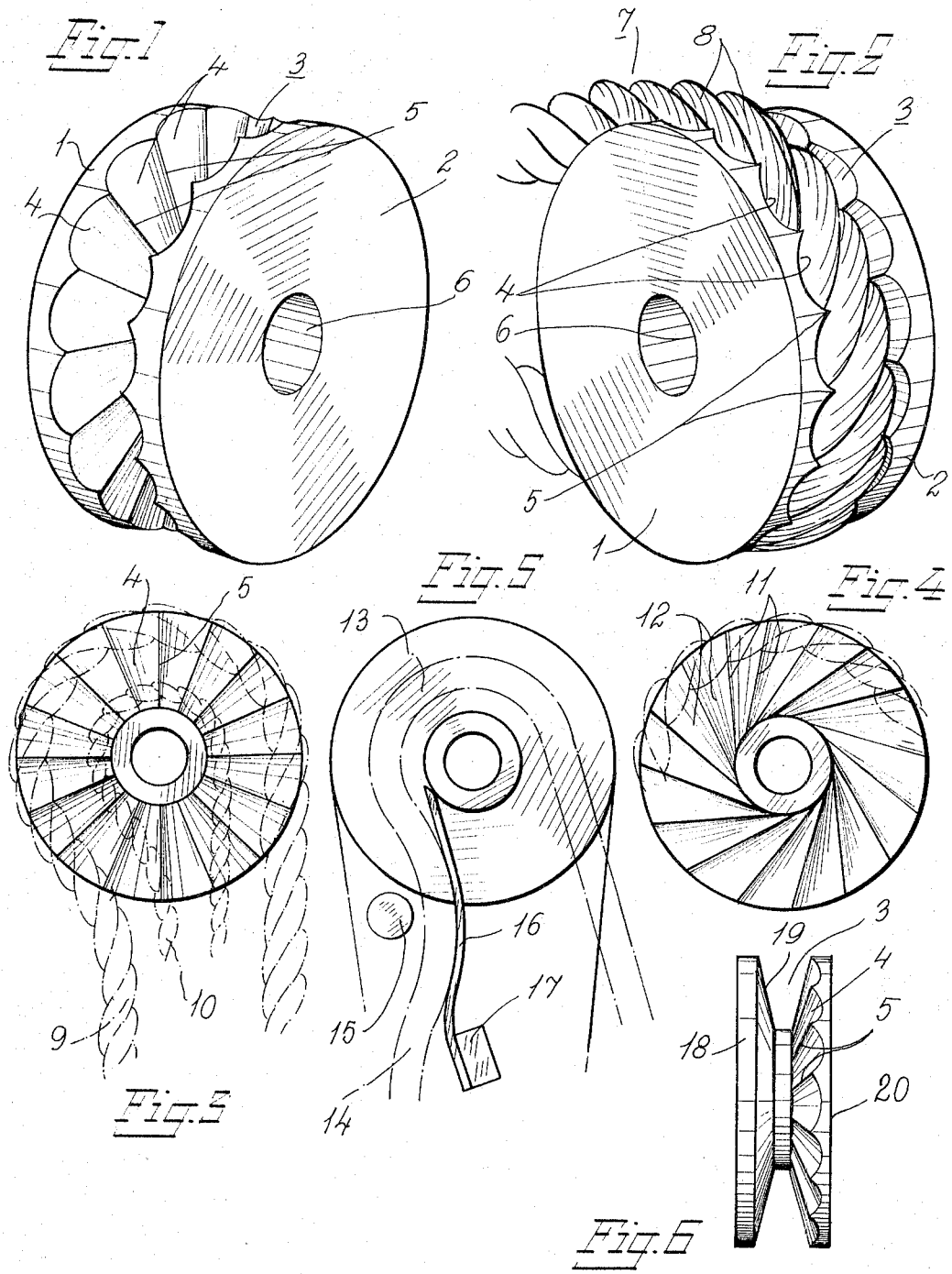

3,302,932
ARRANGEMENT IN PULLEYS FOR ROPES
AND HAWSERS
Carl Olov Harry Wallin, Bergliden 20, Ektorp, Sweden
Filed Mar. 8, 1965, Ser. No. 437,656
Claims priority, application Sweden, Mar. 11, 1964,
3,051/64
4 Claims. (Cl. 254—190)

The present invention relates to an arrangement in pulleys for ropes and hawsers, composed of twisted cords or sections of the kind presenting in section a V-shaped track with converging flank surfaces.

It has long been desired to effect winding of ropes by means of direct driven pulleys where the rope only passes through half a turn around the pulley without subjecting outgoing portion of the rope to a load.

This has encountered great difficulty due to the fact that it was not possible to produce sufficient driving friction, particularly with heavy loads. Therefore, attempts were made to solve the problem by arranging friction members operating in the pulley against the rope, but on one hand this often increased the power required and on the other hand, the quite often relatively sharp friction members caused the rope to wear quickly.

The invention is based upon the fact that the plurality of friction members do not produce the required positive action but slip when subjected to heavy loads. Furthermore, it has been established, in connection with the invention, that the only way of remedying this is to utilize the possibilities of engaging the contours of the rope, e.g. equivalent to the mode of engagement of chains and gearwheels.

In accordance herewith, the invention is mainly characterized in that grooves are formed on at least one flank-surface, said grooves tapering towards the centre of the pulley and arranged angularly spaced in correspondence to the pitch and surface contours of the rope.

The invention will be more closely described below with reference to the attached drawing which presents a number of diagrammatic embodiments of said invention, and in connection therewith further characterizing features of the invention will be set forth.

FIGURE 1 shows a perspective view of an embodiment of a rope pulley according to the invention.

FIGURE 2 also shows a perspective view of the same pulley whereby the rope, in the form of, for example, a hawser, is placed around said pulley, half a turn.

FIGURE 3 shows a radial section of a pulley according to FIGURE 1, illustrating how one and the same pulley can be used for different sized ropes.

FIGURE 4 also shows a radial section similar to FIGURE 3, illustrating a modified embodiment of the inner flanks of the pulley.

FIGURE 5 illustrates diagrammatically a pulley according to the invention together with a half-turn of rope associated with a stripper for said rope.

Finally, FIGURE 6 shows a modified pulley according to the invention whereby both inner flanks of the pulley are of a different design.

Referring firstly to FIGURES 1 and 2 showing a perspective view of a pulley according to the invention, reference numeral 1 indicates one side of the pulley whilst 2 indicates the other. As with common pulleys, the pulley presents a V-shaped track, indicated by reference numeral 3, whereby the flank-surfaces situated on each side, 1 and 2, converge in the usual way towards the centre of the pulley. Wedge-shaped grooves 4, conveniently evenly spaced, are formed on said flank-surface, tapering off towards the centre section of the pulley. Said grooves, in section, have the form of wave-troughs and merge into each other along relatively acute crests 5, which are intended to mesh easily with the worms or channels formed between the rope-sections.

Both halves 1 and 2 of the pulley can be manufactured in one piece, i.e. cast in metal, plastic, etc., or machined from some other tensile material, for example fibre-material.

Alternatively, both halves can be produced separately and assembled onto a suitable shaft, adapted to be passed into the centre hole 6 in the pulley. According to one embodiment of the invention, one half, e.g. 1, can be firmly secured to the shaft and the other half can be rotatable in relation to the same, but in such a way, however, that both halves are in axial agreement, so that the track 3 retains its dimensions. According to another embodiment of the invention, one or both halves of the pulley can be provided with separate securing members, not shown, relative to the shaft, enabling the flank-surfaces to be angularly displaced and secured in relation to one another in a desired manner, for example so that the grooves and crests, respectively, on one flank-surface remain angularly displaced in relation to the grooves and crests, respectively, on the other flank-surface, preferably one half-section approximately. This data is, however, not limiting for the invention, each relative angular rotation between the flank-surfaces lies within the scope of the invention.

In FIGURES 1 and 2 it is assumed that the angular displacement between both said flank-surfaces is substantially half the pitch.

In FIGURE 2, showing the same pulley as FIGURE 1, a hawser, indicated by reference numeral 7, is laid one half-turn around the track 3. The rope sections, in FIGURE 2, are indicated by reference numeral 8 wherefrom it can be seen that the grooves 4 and the crests 5 are conveniently spaced in relation to the rope sections and are also so shaped in agreement with the contours of said rope section that the grooves 4 and crests 5 mesh with said contour of the rope section and penetrate into the channels or worms appearing between the sections. The grooves are preferably spaced angularly in correspondence with the pitch and outer contours of the rope sections and, as can be seen from FIGURE 2, it is advantageous to angularly displace the grooves and crests, mutually, on the one flank-surface in relation to the corresponding second flank-surface, whereby a mesh is obtained which closely resembles and functions as a gear-mesh.

FIGURE 3 illustrates how a pulley of the type described can be used for ropes of various dimensions, said ropes being engaged at various corresponding radii between the flank-surfaces. In FIGURE 3 a relatively heavy rope or hawser, indicated by reference numeral 9, is engaged between both flank-surfaces at a large radius whilst a lighter rope or hawser 10 rotating upon a smaller radius in the track. Due to the fact that the wedge-shaped grooves and the crests 4 and 5, respectively, converge, it is possible to use the same pulley for nearly all rope sizes between the maximum and minimum size whereby each size has a corresponding winding and unwinding radius on the flank-surfaces.

The grooves, as well as the crests, in the embodiments described, have been arranged completely axially. In certain cases it may be more convenient to modify the slope of the grooves as well as the crests and as an example, FIGURE 4 presents crests 11 and grooves 12 which are substantially tangential in relation to an imagined inner circle of the pulley.

When using a pulley of the described type, where the outgoing portion of the rope is, as a rule, untensioned, it is often necessary to strip the rope from the pulley positively in order to prevent the rope from coiling round and tangling with the ingoing portion of the rope. As an example of an arrangement for preventing this from happening, a pulley of, for example, the type illustrated in FIGURES 1 and 2, over which a rope 13 is passed one half of a turn, is shown in FIGURE 5. In order to force the outgoing portion, as is the case in FIGURE 5, out of the track, when the rope is being winched, a stripper 16 can be combined with the pulley. This stripper can be in the form of a spring, strip or the like, which can be secured, by means of a bracket 17, to a convenient, stationary support in relation to the pulley. Thus, when the outgoing portion of the rope 14, after rotating half a revolution around the pulley, is fed out, it is seized by the guide 16, as shown in FIGURE 5, and is gently led out of continued engagement with the pulley. When playing the rope it may also be of advantage to force the then ingoing portion of the rope into the track. It is possible here, as shown in FIGURE 5, to use a suitable pin 15, under which the rope may run.

The pulley according to the invention can be modified in a variety of ways and as an example FIGURE 6 shows a pulley, the one half of which presents a substantially plane and conical flank-surface 19 whilst the corresponding half 20 presents the earlier mentioned grooves 4 and crests 5. A combination effect between contour-engagement and wedge-effect in track 3 is obtained with a pulley of this type, this fact can sometimes be of advantage, not least from the point of manufacture.

The invention is not limited to the embodiments described and illustrated but can be varied in many ways within the scope of the basic inventive idea.

What is claimed is:
1. A pulley for ropes, said pulley having grooves formed on each flank surface forming a V-shaped track which converges towards the center of said pulley, the grooves of one flanking surface being displaced from the grooves of the other flanking surface by approximately one-half a pitch, so that said surfaces conform to the contours of varying size ropes.
2. The pulley of claim 1 characterized in that the grooves have a cross section substantially similar to the trough of a wave and merge into each other along relatively acute crests which easily engage in the channels between the sections of the rope.
3. The pulley of claim 1 characterized in that the grooves are, in the main, radial.
4. The pulley of claim 1 characterized in that the grooves are, in the main, tangential in relation to an inner circle in the pulley.

References Cited by the Examiner
UNITED STATES PATENTS

| 264,924 | 9/1882 | Baxter. |
| 601,756 | 4/1898 | Miller. |
| 3,078,074 | 2/1963 | Benedict _____ 254—175.5 |
| 3,100,626 | 8/1963 | Good _____ 254—175.5 |

FOREIGN PATENTS

| 1,021,140 | 11/1952 | France. |
| 901,545 | 7/1962 | Great Britain. |

SAMUEL F. COLEMAN, *Primary Examiner.*